Nov. 23, 1926.

D. F. LEPLEY 1,607,679

OVERTURNING CAGE

Filed Oct. 22, 1924   3 Sheets-Sheet 1

Inventor
D. F. Lepley
By C. A. Snow & Co.
Attorneys

Nov. 23, 1926.
D. F. LEPLEY
1,607,679
OVERTURNING CAGE
Filed Oct. 22, 1924   3 Sheets-Sheet 3
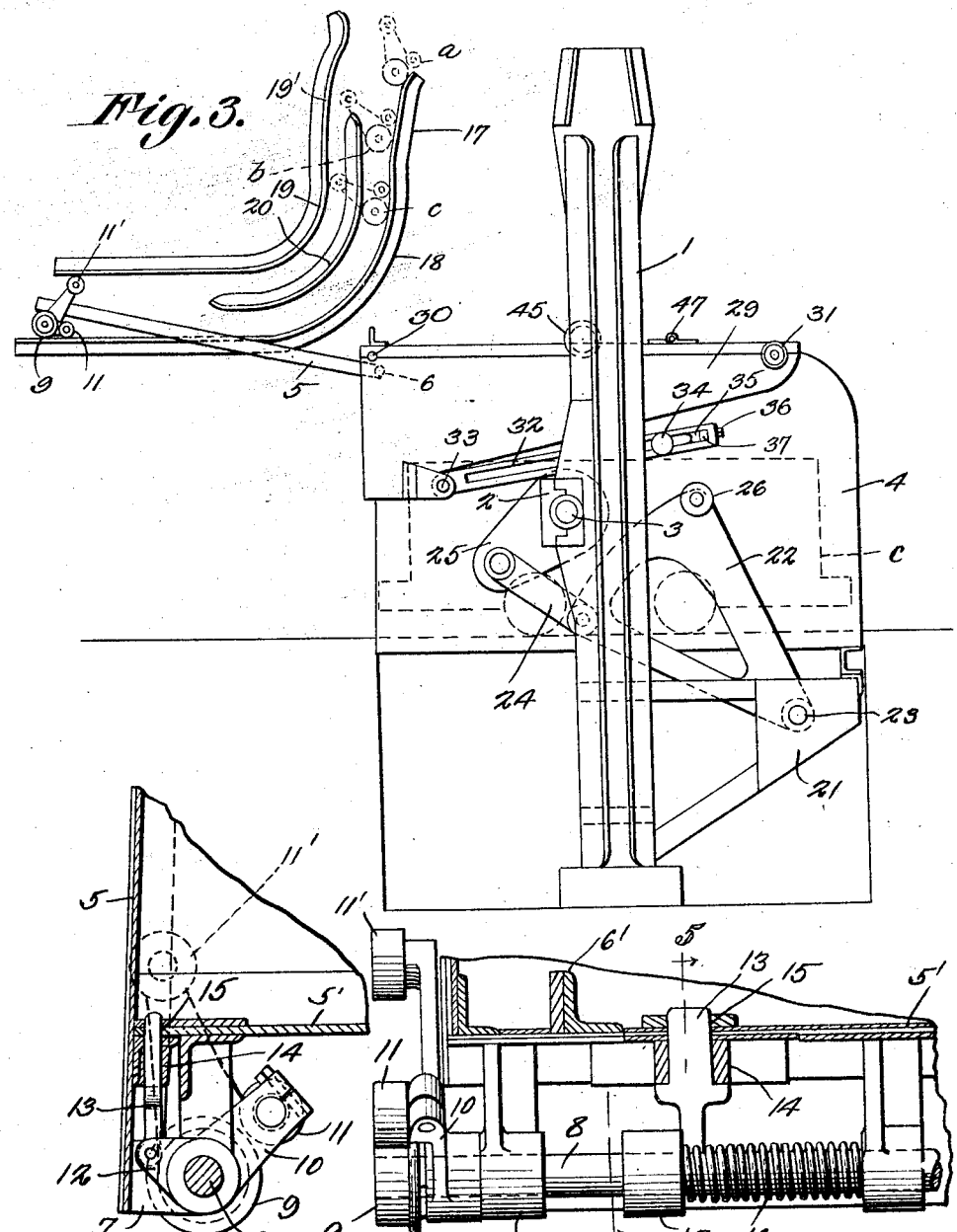

Patented Nov. 23, 1926.

1,607,679

UNITED STATES PATENT OFFICE.

DANIEL F. LEPLEY, OF CONNELLSVILLE, PENNSYLVANIA; PAUL V. LEPLEY, EXECUTOR OF SAID DANIEL F. LEPLEY, DECEASED, ASSIGNOR TO CONNELLSVILLE MANUFACTURING AND MINE SUPPLY CO., OF CONNELLSVILLE, PENNSYLVANIA, A CORPORATION.

OVERTURNING CAGE.

Application filed October 22, 1924. Serial No. 745,196.

This invention relates to overturning cages and is designed primarily as an improvement upon the structure disclosed in Patent #1,475,636 issued to me on November 27, 1923.

In the patented structure the overturning cage is provided with an integral spout normally upstanding therefrom and which is adapted, during the overturning of the cage, to swing downwardly to an inclined delivering position. It has been found in practice that under certain conditions a construction of this type is undesirable because of the rapid sweep of the spout through an extensive arc, which spout, if brought into contact with any obstruction in the path thereof might tend to wreck the apparatus or cause injury to nearby operators.

It is an object of the present invention to provide an overturning cage with a foldable delivering spout normally resting upon the cage but which has means whereby when the cage reaches its point of delivery and is overturned, the spount will be brought to proper delivering position relative to the cage so as to guide bulk material from the cage to a suitably located chute at one side of the shaft in which the cage operates.

Another object is to provide an apparatus of this character which will operate smoothly and which is capable of severe rough handling without danger of the parts becoming broken or otherwise rendered unfit for use.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings

Fig. 3 is a side elevation of the cage and showing the positions of the parts when the cage arrives at its loading or car receiving position.

Fig. 4 is an elevation of the outer locking mechanism of the cage, a part of the cage being shown in section.

Fig. 5 is a section on line 5—5, Fig. 4.

Figure 1:
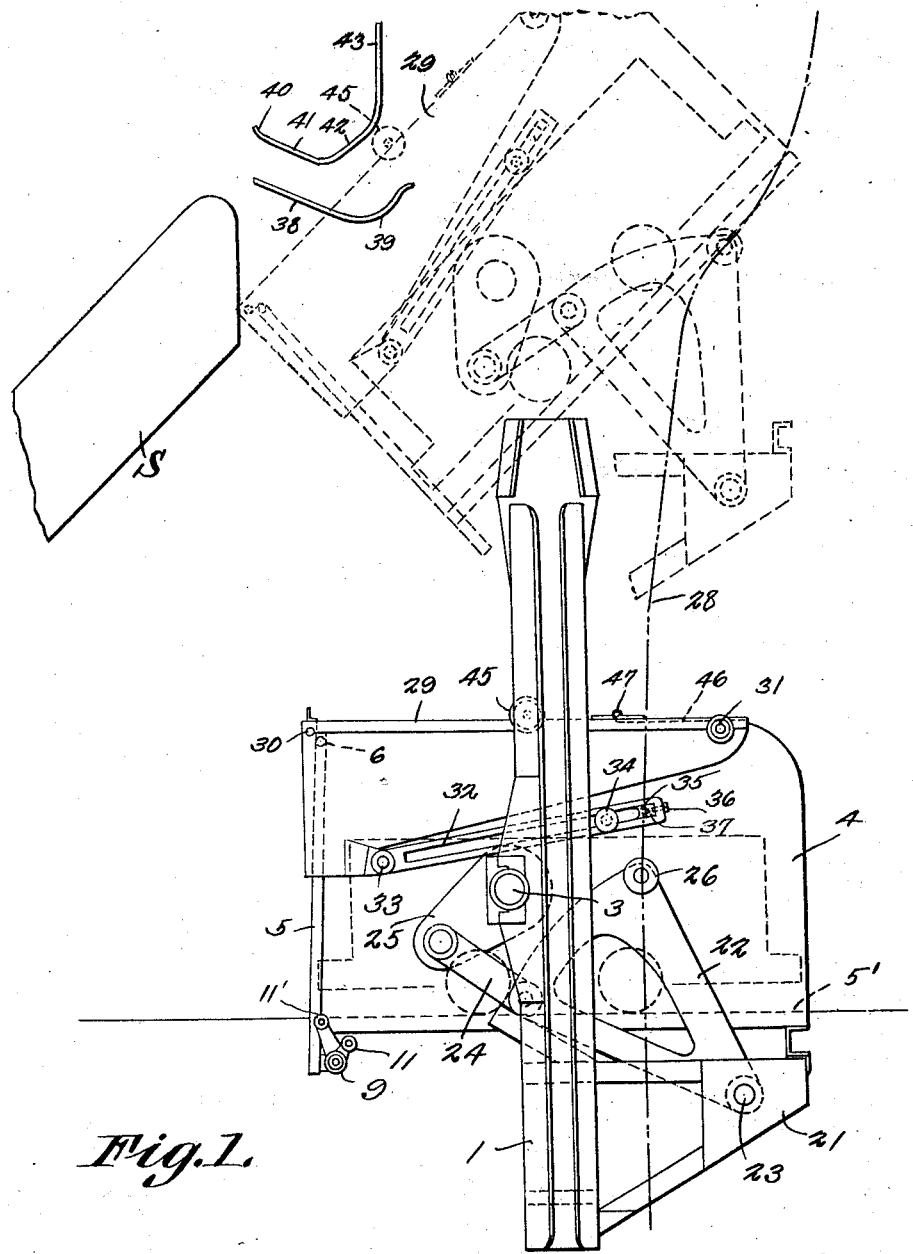
Figure 1 is a side elevation of the cage and a portion of the chute into which delivery is to be made, one position of the cage being illustrated by full lines and another position, indicating one stage in the overturning of the cage, being illustrated by broken lines.

Referring to the figures by characters of reference 1 designates the bail or rail engaging frame of the cage, the sides of this frame being provided with bearings 2 in which are journaled the trunnions 3 extending from the side walls of the cage 4. The cage is provided with a platform 5 having rails 6 for supporting the ordinary mine car C and one end of the cage is adapted to be closed by a door 5 hingedly mounted at its upper end between the side walls of the cage as indicated at 6. One end of this door, when closed, projects below the platform 5 and has bearings 7 in which is journaled a shaft 8. This shaft is provided at each end, with a door supporting wheel 9 and also with a crank arm 10, there being an unlocking roller 11 journaled at one angle of the crank arm and a locking roller 11' at the upper end thereof. At one or more points upon the shaft between the ends thereof are crank arms 12 to which are pivotally connected locking bolts 13, these bolts being slidable within guides 14 connected to the door 6. The platform 5 is provided with openings 15 and when the door is shut the bolts 13 are adapted to be projected upwardly into the openings 15. A spring 16 is mounted on the shaft 8 and is normally under tension so as to hold the bolts 13 projected into the openings 15.

As indicated in Fig. 3, when the cage descends to loading position, each wheel 9 and its roller 11 will come against the inclined or unlocking portion 17 of a guide rail 18, this inclined portion diverging from the upstanding portion of an opposed rail 19 having a curved portion 19'. Both rails 18 and 19 cooperate to provide a curved guide or track which is extended downwardly and laterally as shown and interposed between the curved and upstanding portions of these rails is a short rail 20. It will be apparent that as each wheel 9 and its roller 11 strikes the inclined portion 17, the roller 11 will be gradually shifted toward the rail 20 and roller 11′ will be moved against rail 19 thereby causing the shaft 8 to rotate and the bolts 13 to be retracted from the openings 15. This action takes place while each wheel and its roller are in the positions indicated by dotted lines at $a$, $b$ and $c$. Further downward movement of the cage will result in the wheels 9 and rollers 11 and 11′ shifting outwardly between the rails thereby causing the door 5 to be supported at its outer end as the cage descends, with the result that the car receiving end of the cage will be opened and sufficient clearance left for a car to move off of and onto the cage. As the cage moves upwardly away from the loading position, the action of the door and the parts carried thereby will be reversed. In other words as the cage passes the rails the wheels 9 and rollers 11 will be pulled by the door along the rails and these rails, in turn, will swing the door to closed position and cause the bolts to be moved into the openings 15 by the deflecting action of rail 19 against roller 11′ at 19′. Spring 16 acts as an auxiliary means for holding the bolt in locked position.

The cage 4 is adapted to be overturned by mechanism corresponding with that already disclosed in my patent hereinbefore mentioned. An extension frame 21 is carried by the bail or frame 1 and has one or more levers 22 fulcrumed thereon as at 23. A link 24 connects the lever 22 and a crank arm 25 attached to the side of the cage. A wheel 26 is journaled on lever 22 and is adapted to travel along a guide track 27, a portion of which has been indicated by broken line 28 in Figs. 1 and 2. The curvature of this track is such that as the cage approaches dumping position the wheel 26 traveling along the track will cause lever 22 to shift and thus transmit motion through the link 24 to arm 25 with the result that the cage will gradually overturn from the position shown in full lines in Fig. 1, to the dotted position shown in said figure, thence to the full line position shown in Fig. 2, and finally to the dotted position shown in Fig. 2.

A spout 29 open at both ends is pivotally connected to the sides of the cage 4 as indicated at 30, this point of connection being adjacent the point 6 of the door 5. The sides of the spout normally straddle the sides of the cage and journaled upon the sides of the spout close to the free end thereof are wheels 31. Longitudinally slotted links 32 are pivotally connected to the sides of the cage as shown at 33 and slidably engage studs 34 extending from the sides of the cage. Each link carries an adjustable stop block 35 having a screw 36 whereby it can be moved toward the end of the link. A cushion 37 of rubber or other suitable material is located back of the block to serve as a shock absorber. When the spout 29 is in its normal position across the top of the cage 4 it constitutes the roof thereof as clearly shown in Figures 1 and 3.

Located adjacent the shaft in which the cage is mounted to travel and at the point of delivery is an inclined chute S and mounted adjacent the upper end of this chute is a guide rail 38 which is inclined downwardly toward the path of movement of the cage and has that end thereof which is remote from the chute S, formed with an upwardly extending ogee curve as shown at 39. Arranged above the rail 38 is another guide rail 40, one end portion of which is parallel with the inclined rail 38, as shown at 41 while an intermediate portion is inclined upwardly as at 42 and merges into a substantially vertical portion 43. These portions 42 and 43 overhang the curved portion 39 of rail 38.

Figure 2:
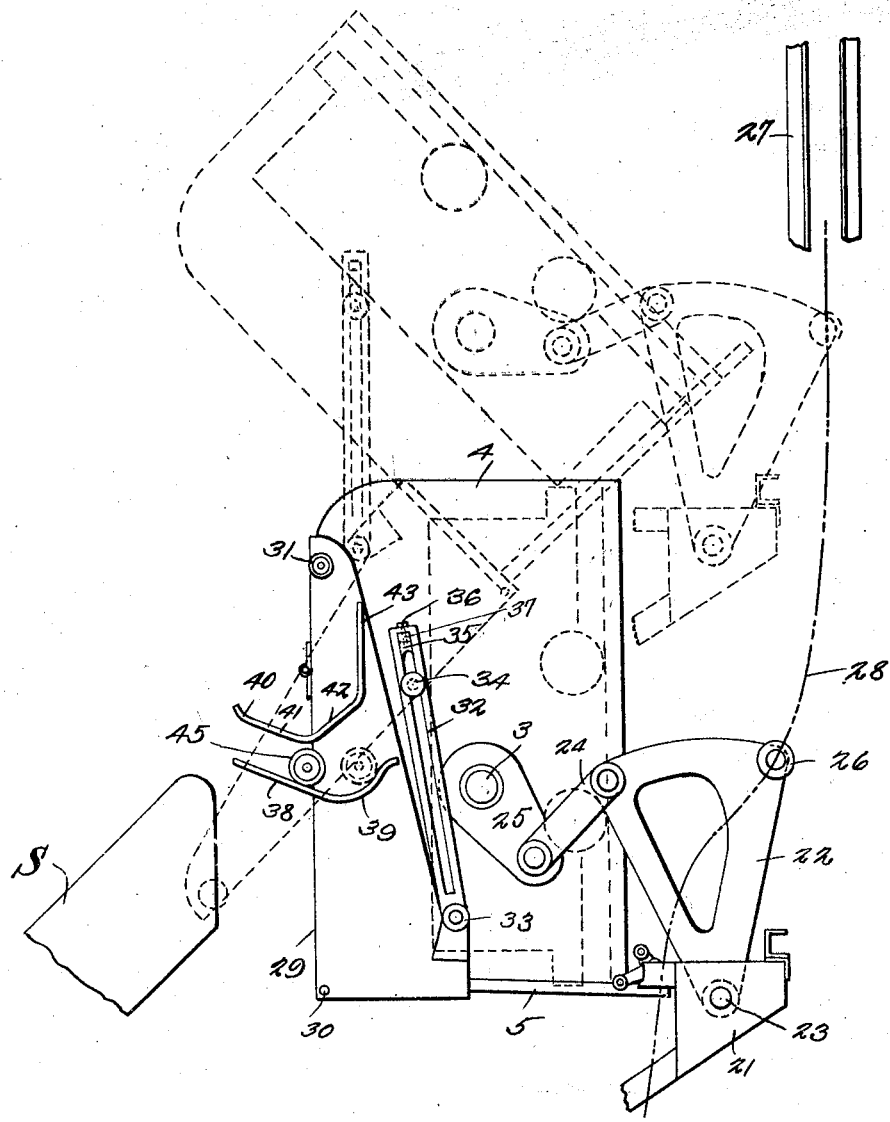
Fig. 2 is a view similar to Fig. 1 showing the cage in two successive positions during the overturning thereof, one position being illustrated by full lines and the other position being indicated by broken lines.

The parts are so located and proportioned that, as the cage approaches its dumping position and begins to overturn, a guide in the form of a wheel or the like 45 which is carried by an intermediate portion of the spout will swing against the upwardly inclined portion 42 of the rail 40 as shown by broken lines in Fig. 1. As the cage continues to overturn during the upwardly movement of its pivotal portion, this wheel 45 will move downwardly along the inclined portion 42 into position between the inclined portions 41 of the rail 40 as shown by full lines in Fig. 2. Up to this time the spout 29 has remained closed against the top of the cage. As the cage continues to move upwardly, however, the spout will swing away from the cage by gravity, and the wheel 45 will work along rail 38 as the spout opens until finally the cage is completely overturned and the wheel 45 is brought to position upon the curved portion 39 of rail 38 at which time said spout is completely opened and will serve to direct bulk material from the overturned cage to the chute S. This position has been illustrated by broken lines in Fig. 2. In case of overwind above a predetermined point, outward swinging movement of the spout relative to the cage is limited by the link 32, it being understood that the cushioned stop block 35 will act as a means for absorbing shocks. When the cage starts to descend the operation of the parts is reversed, the cage gradually moving back to its upright position while the spout is returned to its closed position on the cage. The car C is of course suitably locked to the cage so that it will be held in place while the cage is overturning and when the cage is brought to its lower landing or loading stage the door will automatically open as before explained so that the empty car can be removed and replaced with a full one.

The spout 29 can be formed with a door 46 hingedly mounted as at 47 so that long materials such as rails, timbers and the like can be lowered or raised by the cage in which event, of course, the cage would not be brought to overturned position. This door can be suitably locked and inasmuch as it constitutes no part of the present invention it is not deemed necessary to show or describe it in detail.

It is to be understood that a wheel 45 can be located at each side of the cage in which event one set of rails 38 and 40 will be provided for each wheel.

What is claimed is:—

1. The combination with a cage and means for overturning the same upon approaching its point of delivery, of a spout movably connected to and normally overlying the top of the cage, and cooperating means upon the spout and adjacent the point of delivery respectively for shifting the spout relative to the cage thereby to direct material from the cage to a point therebeyond.

2. The combination with a cage, of means for overturning the same upon reaching its point of delivery, a spout movably connected to the cage and normally folded thereonto, fixed means adjacent the point of delivery of the cage for engagement by the spout during the overturning of the cage to shift the spout relative to the cage and direct material from said cage to a point remote therefrom, and cushioning means for limiting the movement of the spout relative to the cage.

3. The combination with a cage and means for ovreturning the same, of a spout movably connected to the cage, and cooperating means upon the spout and adjacent the point of delivery respectively and controlled by the overturning of the cage for shifting the spout relative to the cage to deliver material from said cage to a point remote therefrom.

4. The combination with a cage and means for overturning the same, of a spout movably connected to and normally resting upon the cage, and cooperating means upon the spout and adjacent the point of delivery respectively and controlled by the overturning of the cage for shifting the spout relative to the cage to deliver material from said cage to a point remote therefrom.

5. The combination with a cage and means for overturning the same, of a spout hingedly connected to and normally resting upon the cage, and cooperating means upon the spout and adjacent the point of delivery respectively and controlled by the overturning of the cage for shifting the spout relative to the cage to deliver material from said cage to a point remote therefrom.

6. The combination with a cage and means for overturning the same, of a spout movably connected to the cage, and cooperating means upon the spout and adjacent the point of delivery respectively and controlled by the overturning of the cage for shifting the spout relative to the cage to deliver material from said cage to a point remote therefrom, and means for limiting the movement of the spout relative to the cage.

7. The combination with a cage and means for overturning the same, of a spout connected to and normally resting upon the cage, cooperating means upon the spout and adjacent the point of delivery respectively and controlled by the overturning of the cage for shifting the spout relative to the cage to deliver material from said cage to a point remote therefrom, and means for limiting the movement of the spout relative to the cage.

8. The combination with a cage and means for overturning the same, of a spout hingedly connected to an normally resting upon the cage, and cooperating means upon the spout and adjacent the point of delivery respectively and controlled by the overturning of the cage for shifting the spout relative to the cage to deliver material from said cage to a point remote therefrom, and means for limiting the movement of the spout relative to the cage.

9. The combination with a cage and means for overturning the same, of a spout movably connected to the cage, and cooperating means upon the spout and adjacent the point of delivery respectively and controlled by the overturning of the cage for shifting the spout relative to the cage to deliver material from said cage to a point remote therefrom, and adjustable means for limiting the movement of the spout relative to the cage.

10. The combination with a cage and means for overturning the same, of a spout movably connected to and normally resting upon the cage, and cooperating means upon the spout and adjacent the point of delivery respectively and controlled by the overturning of the cage for shifting the spout relative to the cage to deliver material from said cage to a point remote therefrom, and adjustable means for limiting the movement of the spout relative to the cage.

11. The combination with a cage and means for overturning the same, of a spout hingedly connected to and normally resting upon the cage, and cooperating means upon the spout and adjacent the point of delivery respectively and controlled by the overturning of the cage for shifting the spout relative to the cage to deliver material from said cage to a point remote therefrom, and adjustable means for limiting the movement of the spout relative to the cage.

12. The combination with a cage, of a spout pivotally connected to and normally resting upon the cage, stationary guide rails adjacent the point of delivery of the cage, a wheel carried by the spout, and means for overturning the cage to bring the said wheel into operative engagement with the rails to shift the spout to delivering position relative to the cage.

13. The combination with a cage, of a spout movably connected thereto and normally closing the top thereof, a stationary rail adjacent the point of delivery of the cage, a wheel upon the spout, and means for overturning the cage when brought to the point of delivery to bring the wheel into operative engagement with the rails to shift the spout to delivering position relative to the cage.

14. The combination with a cage, of a spout normally overlying the top thereof, a wheel carried thereby, means for overturning the cage when brought to delivering position, and means operatively engaged by the wheel during the overturning of the cage to shift the spout to delivering position relative to the cage.

15. The combination with a cage, of a spout hingedly connected to and normally closing the top of the cage, means for overturning the cage, and means operated by the overturning of the cage for shifting the spout relative to the cage to deliver material therefrom.

16. The combination with a cage, of a spout hingedly connected to and normally closing the top of the cage, means for overturning the cage, and means operated by the overturning of the cage for shifting the spout relative to the cage to deliver material therefrom, and means for limiting the movement of the spout relative to the cage.

17. The combination with a cage, of a spout hingedly connected to and normally closing the top of the cage, means for overturning the cage, and means operated by the overturning of the cage for shifting the spout relative to the cage to deliver material therefrom, and adjustable means for limiting the movement of the spout relative to the cage.

In testimony that I claim the foregoing as my own, I have hereto affixed my signature.

DANIEL F. LEPLEY.